United States Patent [19]

Marleau

[11] 4,207,700
[45] Jun. 17, 1980

[54] FLEXIBLY-HINGED TRIANGULAR COLLAPSIBLE NET ASSEMBLY

[76] Inventor: Gilles Marleau, 85 Brady St., Hull, Quebec, Canada, J8Y 5L6

[21] Appl. No.: 937,984

[22] Filed: Aug. 30, 1978

[51] Int. Cl.² .............................................. A01K 77/00
[52] U.S. Cl. .................................................... 43/12
[58] Field of Search ............................................. 43/12

[56] References Cited

U.S. PATENT DOCUMENTS

| | | | |
|---|---|---|---|
| 440,568 | 11/1890 | Hebard | 43/12 |
| 649,581 | 5/1900 | Landman | 43/12 |
| 1,077,481 | 11/1913 | Levy | 43/12 |
| 1,450,322 | 4/1923 | McElhany | 43/12 |
| 1,524,957 | 2/1925 | Sundberg | 43/12 |
| 1,957,944 | 4/1934 | Dexter | 43/12 |
| 2,202,789 | 5/1940 | Benson | 43/12 |
| 2,653,404 | 9/1953 | Phaneuf | 43/12 |
| 2,725,657 | 12/1955 | Wiederhold et al. | 43/12 |
| 2,738,608 | 3/1956 | Buzzini | 43/12 |
| 3,815,272 | 7/1974 | Marleau | 43/12 |

FOREIGN PATENT DOCUMENTS

287461  1/1971  U.S.S.R. ........................................ 43/12

*Primary Examiner*—Othell M. Simpson
*Assistant Examiner*—J. T. Zatarga

[57] ABSTRACT

This net asssembly, designed primarily for fishermen or the like, comprises a flexibly-hinged triangular collapsible trio of net supporting arms, and a handle member. Two of the net supporting arms are hingedly attached to the handle by means of a pair of hinge fingers integrally projecting from the handle. The third of the net supporting arms is hingedly affixed at one end to the other end of one of the first named arms, by a flexible hinge, and is slidably engaged at its other end around the second of said first named pair of arms. The three arms support a net, and in closed position are in close, side-by-side, parallel relationship. The net is opened by sliding the one end of an arm along one of the arms which is hinged to the handle, thus quickly creating a solid triangular net assembly. A cylindrical storage member is provided to act either as an extension handle, or to receive the collapsed net assembly, telescopically.

7 Claims, 11 Drawing Figures

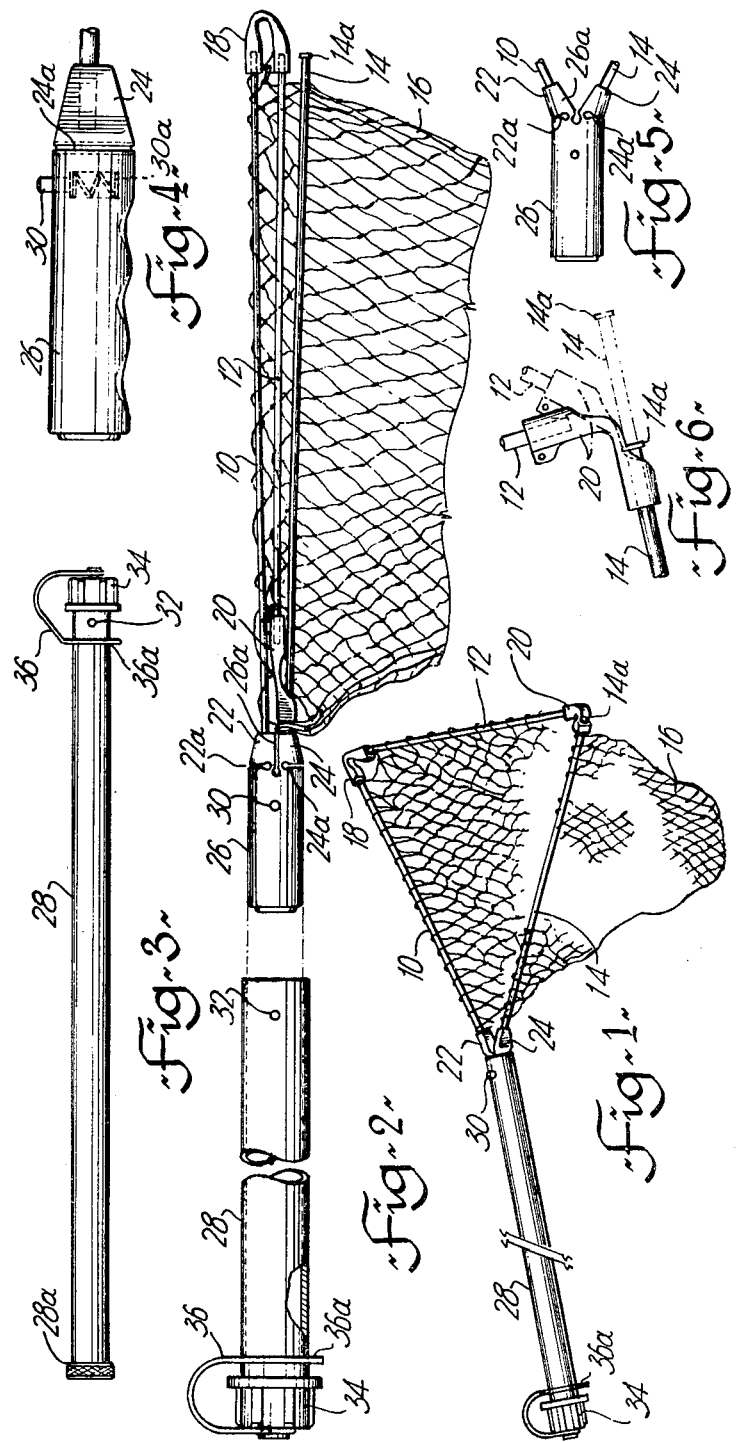

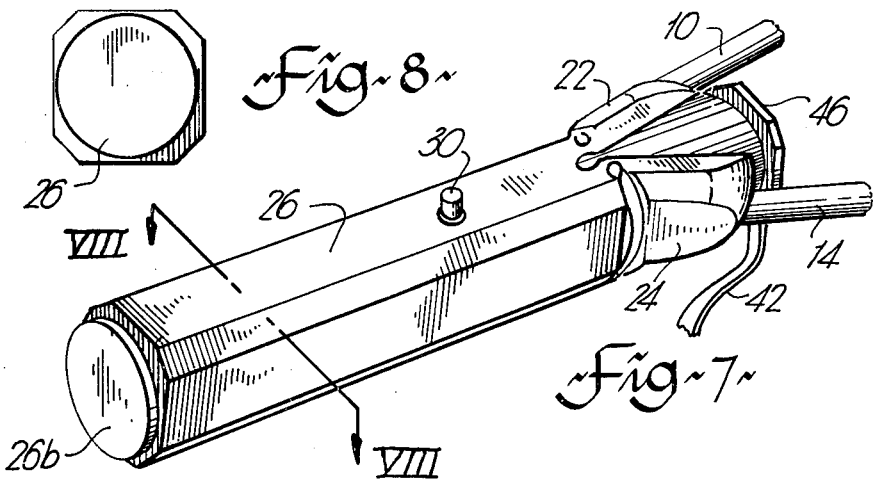
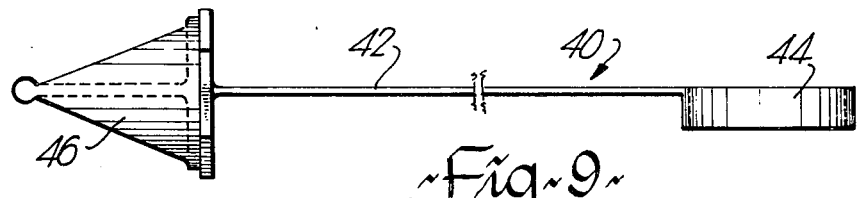
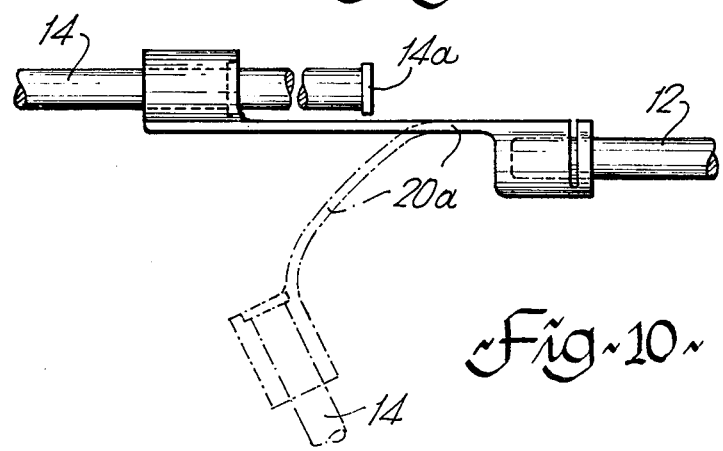
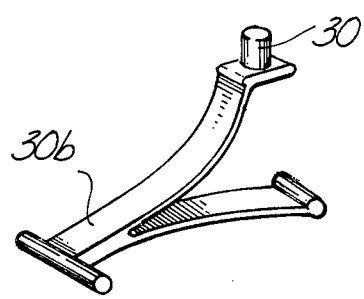

FLEXIBLY-HINGED TRIANGULAR COLLAPSIBLE NET ASSEMBLY

BACKGROUND OF THE INVENTION

The net assembly disclosed herein is an improvement over my prior Canadian Pat. No. 979,649 of Dec. 16, 1975, No. 979,650 of Dec. 16, 1975, and U.S. Pat. No. 3,815,272, and is directed to an assembly of simpler construction, and which represents lower manufacturing cost, while at the same time providing the required strength and long life demanded of fishing nets and the like.

As seen in my prior patents various types of hinges are used in combination with the net-supporting arm assembly, and the arm assembly is pivotally attached to the net assembly handle, by various mechanical contrivances.

The principal improvement disclosed herein is in the structure of the hinge connecting the arm assembly to the handle, and the hinges uniting the net-supporting arms.

SUMMARY OF THE INVENTION

A principal object of the invention is to provide a flexibly-hinged triangular collapsible net assembly comprising: a handle member having a pair of flexible, projecting hinge fingers and three net-supporting arms. The first and second of said net-supporting arms are affixed at one end to a respective one of said pair of hinge fingers. The third of said net-supporting arms is hingedly affixed at one end to the free end of one of the first and second arms and at its other end by a hinge of flexible material; the third of said net-supporting arms having a hinge member of flexible material affixed to its other end which is slidably surrounding the free end of the other one of said first and second arms, whereby said last-named hinge member may be slidably urged along the associated arm to open the net-supporting arms into open, triangular net-supporting position, or to close said net assembly until said net-supporting arms are in close, side-by-side parallel relationship.

Detailed reference will now be made to the drawings wherein:

BRIEF DESCRIPTION OF THE DRAWINGS

FIG. 1 is a perspective view of a net assembly in open or operable position;

FIG. 2 is a perspective view of the net assembly in collapsed position, with a portion of the net broken away;

FIG. 3 is a plan view of the net assembly in its storage handle;

FIG. 4 is a side plan in enlarged scale of the net assembly handle, partly in section;

FIG. 5 is a top plan of the handle of FIG. 4;

FIG. 6 is a plan view of a corner hinge in two positions, one in broken lines, in an enlarged scale;

FIG. 7 is a perspective view of a modified form of the handle of FIG. 5;

FIG. 8 is a section of the body of the handle taken along line VIII—VIII of FIG. 7;

FIG. 9 is a plan view of the stiffener plug and cap member for use with the handle hinge of FIG. 7;

FIG. 10 is a plan view partly in broken lines of an improved corner hinge; and

FIG. 11 is a perspective view of an alternative spring-stop for use with the invention.

DESCRIPTION OF THE INVENTION

Detailed reference will now be made to the drawings, wherein like reference numerals will identify like parts.

As seen in FIG. 1 the collapsible net assembly comprises three net-supporting arms 10, 12 and 14, from which net 16 depends. Arms 10 and 12 are joined by a flexible hinge 18, while arms 12 and 14 are joined by a flexible hinge 20. Arm 14 is slidably engaged in hinge 20 as will become clear hereinafter. Arms 10 and 14 terminate in hinge members 22 and 24 of net handle 26 (see FIGS. 2, 4 and 5).

Referring now to FIG. 2, it will be seen that handle 26 is adapted for telescopic engagement within storage-extension handle 28, handle member 26 having a spring-urged stop member 30 adapted to be received within a hole 32 in storage-extension handle 28. As seen in FIG. 4, spring-urged stop member 30 projects outwardly from handle 26, and is urged to the position shown in FIG. 4 by spring 30a. It will be appreciated, however, that handle 26 may be itself used, without the benefit of storge-extension handle 28, when the net assembly is being used in confined quarters, such as in a small canoe, or the like. For this purpose it will be seen that handle 26 is provided with finger indentations.

Still referring to FIG. 2, handle 26 may be telescopically urged within storage-extension handle 28 until net arms 10, 12 and 14 and net 16 are all contained within storage-extension handle 28, that is, until the net assembly is completely contained therein. As seen in FIG. 3, storage-extension handle 28 may then be capped with a suitable member 34 which is illustrated affixed to storage-extension handle 28 by a flexible restraining arm 36 which surrounds storage-extension handle 28 at 36a. Cap restraining member 36 may be slidably urged along storage-extension handle 28, when the storage-extension handle is being used as a handle, as in FIG. 1, until it is in the position illustrated in FIGS. 1 and 2, snapped over the end closure 28a of storage-extension handle 28.

Referring now to FIG. 5, handle 26 is seen to include a pair of integral, flexible, projecting hinge fingers 22 and 24 which are unitary therewith and which are adapted to be engaged with an end of a respective one of arms 10 and 14. It will be seen that handle 26 is diametrically slit at 26a (see FIG. 2) to provide two semi-conical sections so that when the net is in open position, the flexible hinge fingers 22 and 24 can spread apart as illustratfed in FIGS. 1 and 5. A pair of tangential slits 22a and 24a are provided at right angles to diametric slit 26a, each of said slits 26a, 22a and 24a terminating in a small cylindrical hole to facilitate opening and closing of fingers 22 and 24 as the net assembly is opened and closed.

Referring now to FIG. 6 a corner hinge 20 of flexible material is permanently engaged at one end with arm 12, and slidably surrounds arm 14 at its other end. As seen in solid lines in FIG. 6 hinge 20 is prevented from passing beyond the end of arm 14 by a stop member 14a at the end thereof. As seen in broken lines in FIG. 6 hinge 20 may be slidably urged along arm 14, while the net assembly is being collapsed to the position illustrated in FIG. 2.

Hinges 18, 20, and handle member 26 (and its hinge fingers 22 and 24) are preferably constructed of flexible plastics, having long life, in spite of repeated flexing.

Suitable plastics are high density polyethylene or the like, capable of withstanding repeated bending.

In operation, to remove the net assembly from storage position within storage-extension handle 28, cap 34 is snapped off the end of storage-extension handle 28, where a portion of the net will be accessible, so that the net and net arms may be manually urged telescopically out of storage-extension handle 28, with net assembly handle 26 either being left within storage-extension handle 28, and restrained therein by spring-urged stop member 30 as already discussed, or completely removed therefrom, if the net assembly is to be used without the benefit of an extension handle 28. Flexible hinge 20 is then urged along arm 14 until it meets stop 14a thereof, and the arms 10, 12 and 14 will then be in open triangular position as illustrated in FIG. 1.

When the net assembly is to be used in combination with the storage-extension handle 28, cap 34 may be urged along the length of storage-extension handle 28 and snap on the remote end thereof, as illustrated in FIG. 2.

Net-supporting arms 10, 12 and 14 may be manufactured of metal, of suitable plastics, or of fiberglass, as will be understood by those skilled in the art.

Referring to FIGS. 7 and 8, an improved handle 26a is illustrated, being octagonal in cross-section, whereby, as handle 26 is inserted within storage tube 28 any tendency for an air-lock to be created, as handle 26a is inserted within storage tube 28 is eliminated. In other words, the octagonal configuration of handle 26a leaves ample space for air to escape from within tube 28 during insertion thereof.

As illustrated in FIG. 8, handle 26a is hollow, to serve as a convenient storage compartment for fishing tackle or the like, with a suitable closure 26b being provided at the end opposite hinge members 22, 24.

Referring now to FIG. 9, a combination hinge stiffener and cap for storage handle 28 is illustrated generally at 40. Member 40 comprises an elongate flexible strap 42 having a ring member 44 adapted for frictional engagement around storage tube 28 near one end thereof. A stiffener member 46 is connected to the other end of strap 42. Stiffener member 46 is generally triangular in top plan, and is adapted to be slidably received in the opening created by hinge members 22 and 24 when in operative position, as illustrated in FIG. 7. With stiffener member 46 slidably engaged between hinge members 22, 24, any tendency of the net arms 10 and 14 to twist in opposite directions, as, for example, when netting a fish of substantial weight, is completely eliminated. It will be further appreciated that stiffener 46 may be readily inserted between hinge members 22 and 24 during use, and equally simply removed therefrom when it is desired to close the net and store it within storage handle 28. At such time, stiffener 46 is used as a plug to close storage handle 28, and at the same time ensure that stiffener member 46 is not misplaced when the net assembly is not in use, should ring member 44 be inadvertently removed from engagement with tube 28.

Referring now to FIG. 10 of the drawings, an improved hinge is illustrated, to function as the hinge already described and disclosed in FIG. 6. Hinge 20a of FIG. 10 is constructed of flexible material and is permanently engaged at one end of arm 12 and slidably surrounds arm 14 at its other end. As seen in solid lines, hinge 20 is prevented from passing beyond the end of arm 14 by a stop member 14a at the end thereof. As seen in broken lines, hinge 20a permits arms 12 and 14 to be closed into closely spaced relationship, when arms 12 and 14 are in folded or inoperative position.

Referring now to FIG. 11, an improved spring member 30b is adapted to be slidably urged within handle 26, so that stop member 30 will project through handle 26 or 26a as illustrated in FIGS. 4 and 7 respectively. Spring 30b may be constructed of any suitable flexible material.

The foregoing is by way of example only and the invention should be limited only by the scope of the appended claims.

I claim:

1. A flexibly-hinged triangular collapsible net assembly comprising:
   a handle member having a pair of hinge fingers formed of an integral piece of flexible material extending from one end thereof;
   three rigid net-supporting arms;
   the first and second of said net-supporting arms each being affixed at one end to one of said pair of hinge fingers;
   the third of said net-supporting arms being hingedly affixed at one end to the free end of one of said first and second net-supporting arms, by a hinge of integrally formed flexible material; and at its other end to the free end of the other one of said first and second net-supporting arms by
   a hinge member of integrally formed flexible material slidably surrounding the other one of said pair of first and second net-supporting arms;
   said last-named hinge member being slidably urged along the length of the other one of said first and second arms between a first position wherein the net-supporting arms are open in triangular net-supporting position, and a second position wherein said net-supporting arms are in close, side-by-side parallel relationship and said net is closed.

2. A flexibly-hinged triangular collapsible net assembly according to claim 1, wherein said second arm is provided with a stop member at its free end, adapted to prevent said last mentioned hinge member from passing therebeyond.

3. A flexibly-hinged triangular collapsible net assembly according to claim 1, wherein said handle member and said hinge members being constructed of high density polyethylene or the like, capable of withstanding repeated bending.

4. A flexibly-hinged triangular collapsible net assembly according to claim 1, in combination with a cylindrical storage member and adapted, when said net assembly is in closed position, with said arms in close, side-by-side, parallel relationship to be inserted telescopically within said cylindrical storage member.

5. A flexibly-hinged triangular collapsible net assembly according to claim 4, wherein said handle member includes a projecting, spring-urged stop member, adapted to be received within an opening in said cylindrical storage member, whereby said handle may be inserted within said cylindrical storage member, and maintained in a position near the end thereof, and whereby said cylindrical storage member may be utilized as an extension handle.

6. A flexibly-hinged triangular collapsible net assembly according to claim 1, wherein said handle member is octagonal in transverse cross-section.

7. A flexibly-hinged triangular collapsible net assembly according to claim 1, including a stiffener adapted to be slidably received between said pair of integral, flexible, projecting hinge fingers, when said net is in open operative position.

* * * * *